Patented June 21, 1932

1,863,679

UNITED STATES PATENT OFFICE

OTTMAR WAHL, OF LEVERKUSEN-ON-THE-RHINE, GERMANY, ASSIGNOR TO GENERAL ANILINE WORKS, INC., OF NEW YORK, N. Y., A CORPORATION OF DELAWARE

POLYMETHINE DYESTUFFS

No Drawing. Application filed June 24, 1929, Serial No. 373,475, and in Germany June 28, 1928.

The present invention relates to a process of preparing polymethine dyestuffs and to the new products obtainable thereby, more particularly it relates to dyestuffs of the probable general formula

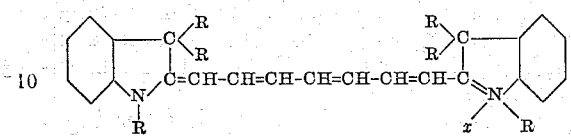

wherein the R's stand for alkyl groups, $x$ stands for a monovalent radical of a strong inorganic acid, such as Cl, $HSO_4$, $NO_3$. My new dyestuffs are obtainable by causing a pyridinium salt, the nitrogen atom of which is labile, such as the dinitrophenyl pyridinium chloride, or a pyridinium cyano-halogenide to react upon about the double molecular quantity of a 1.3.3-trialkyl-2-methylene-indoline of the general formula

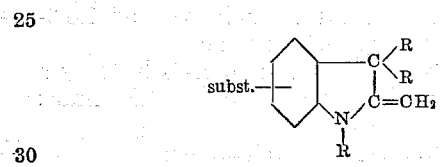

or a salt thereof having the general formula

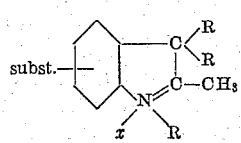

the R's meaning alkyl groups, $x$ a monovalent radical of a strong inorganic acid.

The process can be carried out by melting together the two components for a prolonged time, say for several hours; but the reaction is favorably performed in a suitable solvent, such as a tertiary amine, for example pyridine or dimethyl aniline, by heating the components therein for several hours between 50° C. and the boiling point of the mixture. It is, however, to be understood that the reaction also takes place at lower temperatures, but it only proceeds very slowly. The reaction proceeds according to the following scheme

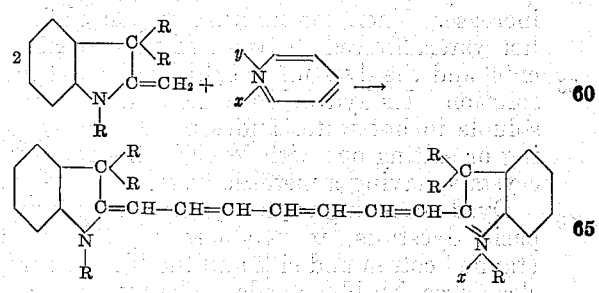

wherein $y$ stands for the dinitrophenyl residue or the cyano group, the R's stand for alkyl groups, and $x$ represents a monovalent radical of a strong inorganic acid. The same polymethine dyestuffs are obtainable by first decomposing the above mentioned pyridinium salts with labile nitrogen atom, with a primary or secondary aromatic amine in the same manner, favourably in an excess of the base as solvent, at elevated temperatures, say between 50° C. and the boiling point of the mixture (compare W. König, Journal für praktische Chemie, vol. 69, page 105, and Zincke, Annalen der Chemie, vol. 330, page 361, seq.), isolating the dyestuff formed and decomposing it with about the double equimolecular quantity of a 1.3.3-trialkyl-2-methylene-indoline or a salt thereof under the same conditions as in the first stage, favourably in a tertiary amine at elevated temperature, as above described. The whole process of this latter method may be represented by the following scheme

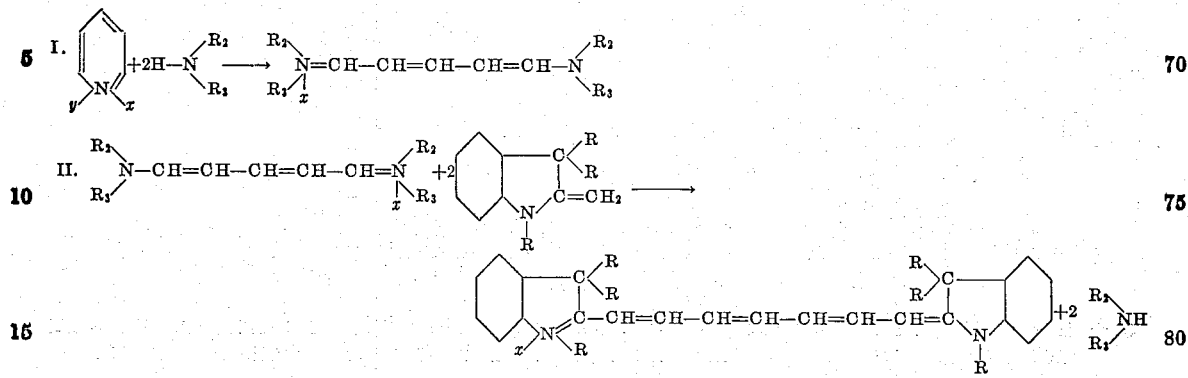

the R's meaning alkyl groups, y the dinitrophenyl residue or the cyano group, $R_2$ an aromatic nucleus, $R_3$ hydrogen or alkyl, and x a monovalent radical of a strong inorganic acid. The new dyestuffs are generally dark, metallic powders, difficultly soluble in cold water, dyeing blue to green shades.

The following examples will serve to illustrate the invention, but without limiting it thereto.

*Example 1.*—1 mol of dinitrophenyl-pyridinium chloride and 2 mols of 1.3.3-trimethyl-2-methylene indoline and dissolved in pyridine and heated to 100° C. until the quantity of the blue dyestuff formed does not increase. Then the mixture is poured into hot water, filtered off from resinous constituents, and the dyestuff is salted out from the solution. Its hydrochloric acid salt is easily soluble in hot water and separates on cooling or salting out with NaCl in the form of crystals, having a metallic luster.

Dyed according to the dyeing methods for basic dyestuffs, it produces on the fiber (tanned cotton and silk and the like) a very clear greenish blue shade. The dyestuff has the following structural formula:

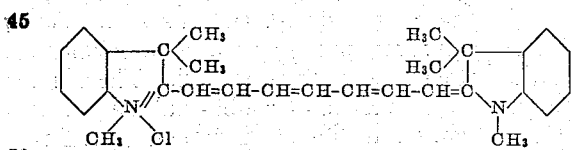

*Example 2.*—3 parts by weight of the yellow dyestuff, obtainable from 1 mol of dinitrophenyl pyridinium chloride and 2 mols of methylaniline, of the following formula:

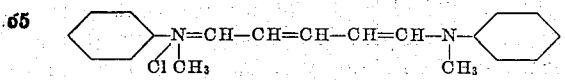

are heated at 60° C. for a few hours with a mixture of 1.3.3-trimethyl-2-methylene-indoline and the acetate of this base obtained from 3.5 parts by weight of the indoline base and 0.6 parts by weight of glacial acetic acid, until the yellow dyestuff has disappeared. At a higher temperature the reaction proceeds more quickly. The mixture is poured into hot water and filtered while hot. On cooling the blue dyestuff crystallizes. The dyestuff is identical with that obtained according to Example 1.

I claim:

1. The process which comprises heating a compound of the probable general formula:

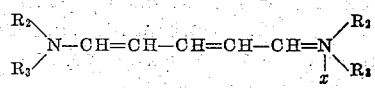

wherein $R_2$ stands for hydrogen or an alkyl group, $R_3$ stands for a radical of the benzene series, and x stands for a monovalent acid radical, with about the double equimolecular quantity of a 1.3.3-trialkyl-2-methylene idoline.

2. The process which comprises heating a compound of the probable formula:

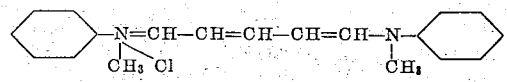

with about the double equimolecular quantity of a 1.3.3-trialkyl-2-methylene-indoline.

3. The process which comprises heating a compound of the probable formula:

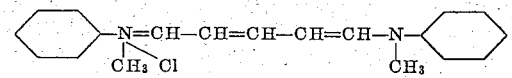

with about the double equimolecular quantity of the hydrochloric acid salt of 1.3.3-trimethyl-2-methylene indoline.

4. The process which comprises heating a compound of the probable general formula:

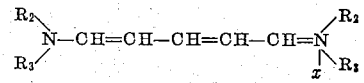

wherein $R_2$ stands for hydrogen or an alkyl group, $R_3$ stands for a radical of the benzene series, and x stands for a monovalent radical of a strong inorganic acid, with about the double equimolecular quantity of a 1.3.3-trialkyl-2-methylene indoline in a tertiary amine as a solvent, between about 50° C. and the boiling point of the reaction mixture.

5. The process which comprises heating a compound of the probable formula:

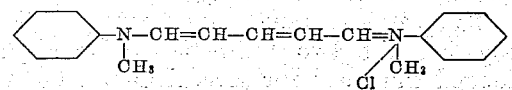

with about the double equimolecular quantity of a 1.3.3-trialkyl-2-methylene indoline in a tertiary amine as a solvent, between about 50° C. and the boiling point of the reaction mixture.

6. The process which comprises heating a compound of the probable formula:

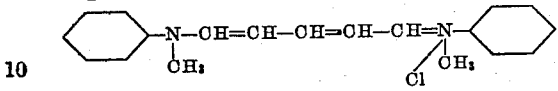

with about the double equimolecular quantity of 1.3.3-trimethyl-2-methylene indoline in a tertiary amine as a solvent, between about 50° C. and the boiling point of the reaction mixture.

7. As new products dyestuffs of the probable general formula

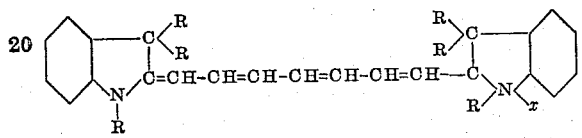

wherein the R's stand for alkyl groups, $x$ stands for a monovalent radical of a strong inorganic acid, said dyestuffs being generally dark metallic lustrous powders, difficultly soluble in cold water, dyeing blue to green shades.

8. As a new product the dyestuff of the formula

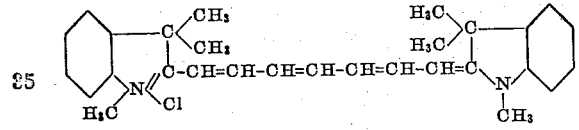

said dyestuff being a dark metallic lustrous powder and dyeing clear greenish blue shades.

In testimony whereof I have hereunto set my hand.

OTTMAR WAHL. [L. S.]